Patented Sept. 29, 1953

2,653,975

UNITED STATES PATENT OFFICE 2,653,975

N-EXO-DIHYDRODICYCLOPENTADIENYL-ACRYLAMIDE

David T. Mowry and Eugene L. Ringwald, Dayton, Ohio, assignors to Monsanto Chemical Company, St. Louis, Mo., a corporation of Delaware No Drawing. Application May 18, 1951, Serial No. 227,124

8 Claims. (Cl. 260—561)

This invention relates to amides of acrylic or methacrylic acid and more particularly provides new N-cycloalkenyl amides of such acids and methods of producing the same.

An object of the invention is the provision of new and valuable N-dicycloalkenyl amides of acrylic and methacrylic acids. Another object of the invention is to provide the hitherto unknown N-exo-dihydrodicyclopentadienylacrylamide or N-exo-dihydrodicyclopentadienylmethacrylamide. Still another object of the invention is the provision of new and valuable products by reaction of acrylonitrile or methacrylonitrile with dicyclopentadiene. A further object of the invention is to provide new dienic alicyclic amides useful as cross-linking agents in the preparation of synthetic rubbers, plastics and resinous materials.

These and other objects hereinafter disclosed are provided by the following invention wherein dicyclopentadiene is contacted, in acidic aqueous media, with acrylonitrile or methacrylonitrile to yield the N-exo-dihydrodicyclopentadienylamide of an acid selected from the class consisting of acrylic and methacrylic acid, probably according to the scheme:

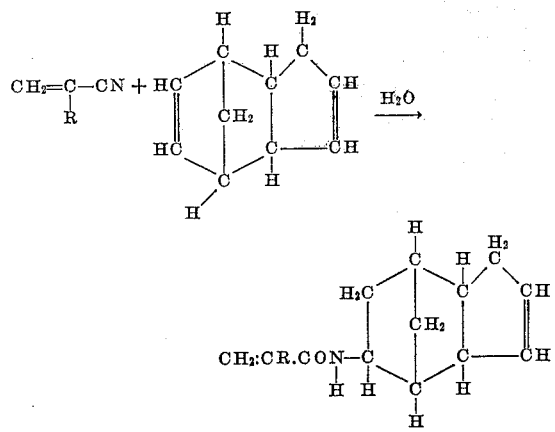

in which R is selected from the class consisting of hydrogen and the methyl radical.

Condensation of dicyclopentadiene with the present nitriles is effected by simply mixing together the two reactants in water in the presence of an acidic agent and allowing the resulting mixture to stand at ordinary or moderately increased temperatures, e. g., at temperatures of from 0° C. to 60° C., until formation of the amides has occurred. As acidic agents there may be employed acid-reacting materials generally; although, for best yields of the amides we prefer to use strong acids or strong acid-reacting materials, i. e., compounds which when dissolved in water have ionization constants at least equal to that of phosphoric acid.

Acrylonitrile is known to add to mono-olefinic hydrocarbons to yield mono-olefinic amides (see Ritter and Minieri, J. Amer. Chem. Soc. 4045 (1948)) and nitriles, generally, have been reported to add to the double bond of mono-olefinic hydrocarbons (see the Gresham et al. U. S. Patent No. 2,457,660). That dicyclopentadiene participates in the reaction with addition of the acrylonitrile or methacrylonitrile at only one of the double bonds of the diene is unexpected, in view of the recognized propensity of the nitriles to add to olefinic double bonds. The usefulness of the present amides is associated with the presence of two double bonds therein.

N-exo-dihydrodicyclopentadienylacrylamide and N-exo-dihydrodicyclopentadienylmethacrylamide are relatively stable, well-defined, crystalline solids melting at about 140–2° C. and about 150–1° C., respectively. They are advantageously employed as cross-linking agents in the manufacture of butadiene and butadiene-styrene rubbers, and as cross-linked copolymerizable monomers in the preparation of cross-linked, substantially insoluble copolymers of vinyl compounds, e. g., the alkyl acrylates or methacrylates, styrene, acrylonitrile, vinyl chloride, etc. Since the two olefinic double bonds have substantially different reactivities in polymerization reactions, these monomers may be copolymerized to produce either soluble or insoluble polymers depending on the conditions employed. The present amides are also useful for a variety of other commercial or industrial purposes, e. g., as lubricant additives, chemical intermediates, etc.

The invention is illustrated, but not limited, by the following examples:

*Example 1*

Fifty three parts of acrylonitrile were slowly added, with stirring and cooling, to 103 parts of 91 per cent sulfuric acid. To the resulting solution there were then gradually added 132 parts of freshly distilled dicyclopentadiene. Heat was developed during the addition of the dicyclopentadiene and ice-cooling had to be employed in order to maintain the temperature of the mixture at below 30° C. The whole was then allowed to stand at room temperature for about 48 hours, and the resulting very thick reaction mass was then transferred into a dilute aqueous solution of sodium carbonate in order to neutralize the acid. The resulting yellow solid was then removed by filtration, twice crystallized from dilute ethanol and dried. There was thus obtained 42.5 parts of the substantially pure N-exo-dihydrodicyclopentadienylacrylamide, M. P. 140–1° C. Redistillation of this product at 192° C./5 mm., gave 34 parts of almost colorless crystals M. P. 141–2° C.

Copolymerization of the N-exo-dihydrodicyclopentadienylacrylamide with ethyl acrylate (in a 1:4 weight ratio) yielded a copolymer having very good thermal characteristics.

*Example 2*

Two hundred one parts of methacrylonitrile, 295 parts of 95.5 per cent sulfuric acid and 14 parts of water were brought together slowly, with stirring and cooling. Then 396 parts of freshly distilled dicyclopentadiene were added, dropwise, over a period of several hours while keeping the temperature below 45° C. and generally at about 20° to 25° C. The whole was then stirred at room temperature for about 18 hours. The resulting very viscous, thick, reaction mixture was then slowly added to 2 liters of water containing 318 parts of sodium carbonate. The precipitate of yellow solid which formed was recovered by filtration, and dissolved in about 1.5 liters of hot ethanol. After filtering the resulting solution to remove a small quantity of insoluble material, water was added to the filtrate. The resulting aqueous solution was then cooled to give 287 parts (45% theoretical yield) of the crystalline N - exo - dihydrodicyclopentadienylmethacrylamide, M. P. 149.5–151.2° C. Distillation of this amide at 160° C./1–2 mm., and recrystallization from a benzene-hexane solution gave a substantially colorless and purer N-exo-dihydrodicyclopentadienylmethacrylamide, M. P. 150–1° C.

What we claim is:

1. An amide selected from the class consisting of N - exo-dihydrodicyclopentadienylacrylamide and N-exo-dihydrodicyclopentadienylmethacrylamide.

2. N - exo - dihydrodicyclopentadienylacrylamide.

3. N - exo - dihydrodicyclopentadienylmethacrylamide.

4. The method which comprises contacting, at a temperature of up to 60° C., substantially one mole of a nitrile selected from the class consisting of acrylonitrile and methacrylonitrile with substantially one mole of dicyclopentadiene in water and in the presence of an acid catalyst and recovering from the resulting reaction product an amide selected from the class consisting of N-exo-dihydrodicyclopentadienylacrylamide and N-exo-dihydrodicyclopentadienylmethacrylamide.

5. The method which comprises contacting, at a temperature of up to 60° C., substantially one mole of a nitrile selected from the class consisting of methacrylonitrile and acrylonitrile with substantially one mole of dicyclopentadiene in an aqueous solution of an acidic catalyst which when dissolved in water has an ionization constant at least equal to that of phosphoric acid, and recovering from the resulting product an amide selected from the class consisting of N-exo-dihydrodicyclopentadienylacrylamide and N-exo-dihydrodicyclopentadienylmethacrylamide.

6. The method which comprises contacting, at a temperature of up to 60° C., substantially one mole of a nitrile selected from the class consisting of acrylonitrile and methacrylonitrile with substantially one mole of dicyclopentadiene in aqueous sulfuric acid and recovering from the resulting reaction product an amide selected from the class consisting of N-exo-dihydrodicyclopentadienylmethacrylamide.

7. The method which comprises contacting, at a temperature of up to 60° C., substantially one mole of acrylonitrile with substantially one mole of dicyclopentadiene in aqueous sulfuric acid and recovering N - exo - dihydrodicyclopentadienylacrylamide.

8. The method which comprises contacting, at a temperature of up to 60° C., substantially one mole of methacrylonitrile with substantially one mole of dicyclopentadiene in aqueous sulfuric acid and recovering N-exo-dihydrodicyclopentadienylmethacrylamide.

DAVID T. MOWRY.
EUGENE L. RINGWALD.

References Cited in the file of this patent

UNITED STATES PATENTS

| Number | Name | Date |
|---|---|---|
| 2,395,452 | Bruson | Feb. 26, 1946 |
| 2,457,660 | Gresham et al. | Dec. 28, 1948 |
| 2,573,673 | Ritter | Oct. 30, 1951 |

OTHER REFERENCES

Ritter et al.: "J. Am. Chem. Soc.," vol. 70 (1948), pp. 4045 to 4048.